US012354786B2

(12) United States Patent
Tobita et al.

(10) Patent No.: US 12,354,786 B2
(45) Date of Patent: Jul. 8, 2025

(54) MULTILAYER COIL COMPONENT

(71) Applicant: TDK CORPORATION, Tokyo (JP)

(72) Inventors: Kazuya Tobita, Tokyo (JP); Youichi Kazuta, Tokyo (JP); Yuichi Takubo, Tokyo (JP); Junichiro Urabe, Tokyo (JP); Noriaki Hamachi, Tokyo (JP); Yuto Shiga, Tokyo (JP); Toshinori Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 668 days.

(21) Appl. No.: 17/696,326

(22) Filed: Mar. 16, 2022

(65) Prior Publication Data

US 2022/0301764 A1 Sep. 22, 2022

(30) Foreign Application Priority Data

Mar. 19, 2021 (JP) ................................ 2021-046039

(51) Int. Cl.
*H01F 27/29* (2006.01)
*H01F 17/00* (2006.01)

(52) U.S. Cl.
CPC ....... *H01F 27/292* (2013.01); *H01F 17/0013* (2013.01); *H01F 2017/002* (2013.01)

(58) Field of Classification Search
CPC ............... H01F 27/292; H01F 17/0013; H01F 2017/002
See application file for complete search history.

(56) References Cited

U.S. PATENT DOCUMENTS

2012/0306607 A1* 12/2012 Jeong .................. H01F 17/0013 336/192
2015/0014042 A1* 1/2015 Noguchi ................ H05K 1/165 174/262
2016/0217905 A1* 7/2016 Yang ...................... H05K 1/113
2017/0133309 A1* 5/2017 Kim .................... H01L 23/5389
2018/0242464 A1* 8/2018 Hasegawa .............. H05K 3/462

FOREIGN PATENT DOCUMENTS

JP H05-57817 U 7/1993
JP 2015-019108 A 1/2015
JP 2016-139786 A 8/2016
JP 2018170495 A * 11/2018 ............. H05K 1/115

* cited by examiner

*Primary Examiner* — Malcolm Barnes
(74) *Attorney, Agent, or Firm* — Oliff PLC

(57) ABSTRACT

A multilayer coil component includes: a through hole connecting portion electrically connecting an end portion of the coil portion and the external terminal, in which a coil pattern and a through hole pattern are formed in each of the plurality of layers, the through hole connecting portion is formed by mutually joining a plurality of the through hole patterns in the lamination direction, the through hole pattern in at least one first layer among the plurality of layers is shifted with respect to the through hole pattern in another second layer when viewed from the lamination direction, and, when viewed from the lamination direction, a distance between the through hole pattern in the first layer and a coil pattern in the first layer is farther than a distance between the through hole pattern in the second layer and the coil pattern in the first layer.

8 Claims, 13 Drawing Sheets

MULTILAYER COIL COMPONENT

CROSS REFERENCE TO RELATED APPLICATIONS

This application claims priority to Japanese Patent Application No. 2021-046039 filed on Mar. 19, 2021, the entire contents of which are incorporated by reference herein.

TECHNICAL FIELD

The present disclosure relates to a multilayer coil component.

BACKGROUND

In the related art, the multilayer coil component described in Japanese Unexamined Patent Publication No. 2015-19108 is known as a multilayer coil component. This multilayer coil component includes an element body made of an insulator, an external terminal formed on the bottom surface of the element body, and a coil portion provided in the element body. An end portion of the winding of the coil portion is connected to the external terminal via a pull-out portion conductive in a lamination direction. In this multilayer coil component, a coil pattern is printed on the upper surface of the sheet material of the insulator. In addition, the pull-out portion is configured by a via pad printed on the upper surface of the sheet material and a via conductor where a through hole penetrating the sheet material is filled with a conductor. The via conductor is shifted so as to have a center line that does not coincide.

SUMMARY

In some multilayer coil components, a through hole connecting portion is formed by forming a through hole pattern itself on a sheet material and mutually joining a plurality of the through hole patterns in a lamination direction, which is different from the via pad printing on the upper surface of the sheet material of the insulator. In a case where this structure is adopted, the multilayer coil component of Japanese Unexamined Patent Publication No. 2015-19108 has a structure in which the via pad itself in each layer is extended in the lamination direction to serve as a through hole pattern and joined to the through hole pattern in another layer. In this case, the through hole connecting portion is configured so as to extend in the lamination direction in a state where the through hole patterns of the same shape are linearly continuous at the same position. In a case where such a linear through hole connecting portion is adopted, product deformation may arise from an increase in the conductor volume of the through hole connecting portion. Further, in a case where a coil pattern and the through hole pattern are close to each other, a decline in self-resonant frequency (SRF) as a problem arises from an increase in the effect of the stray capacitance between the coil and through hole patterns.

An object of the present disclosure is to provide a multilayer coil component capable of suppressing product deformation and improving the self-resonant frequency.

A multilayer coil component according to the present disclosure includes: an element body formed by laminating a plurality of layers made of an insulator in a lamination direction; an external terminal formed on a bottom surface of the element body; a coil portion provided in the element body with a coil axis perpendicular to the bottom surface;

and a through hole connecting portion provided in the element body and electrically connecting an end portion of the coil portion and the external terminal, in which a coil pattern and a through hole pattern are formed in each of the plurality of layers, the through hole connecting portion is formed by mutually joining a plurality of the through hole patterns in the lamination direction, the through hole pattern in at least one first layer among the plurality of layers is shifted with respect to the through hole pattern in another second layer when viewed from the lamination direction, and, when viewed from the lamination direction, a distance between the through hole pattern in the first layer and a coil pattern in the first layer is farther than a distance between the through hole pattern in the second layer and the coil pattern in the first layer.

The multilayer coil component according to the present disclosure includes the coil portion where the coil axis is perpendicular to the bottom surface and the external terminal formed on the bottom surface of the element body. Accordingly, the end portion of the coil portion disposed at a position higher than the bottom surface and the external terminal of the bottom surface need to be electrically connected by the through hole connecting portion. The through hole connecting portion is formed by mutually joining the plurality of through hole patterns in the lamination direction, and thus an increase in conductor volume is likely to occur. On the other hand, in the present disclosure, the through hole pattern in the at least one first layer among the plurality of layers is shifted, when viewed from the lamination direction, with respect to the through hole pattern in the other second layer. By the through hole pattern being shifted in this manner, it is possible to suppress the conductor volume that is attributable to joining the plurality of through hole patterns while ensuring conductivity in the lamination direction. As a result, an increase in conductor volume in the through hole connecting portion can be suppressed and product deformation can be suppressed. In addition, when viewed from the lamination direction, the distance between the through hole pattern in the first layer and the coil pattern in the first layer is farther than the distance between the through hole pattern in the second layer and the coil pattern in the first layer. In the first layer of such a configuration, the through hole pattern can be disposed at a position as far as possible from the coil pattern in the same layer. Accordingly, the effect of the stray capacitance between the through hole pattern and the coil pattern can be suppressed and the self-resonant frequency can be improved. As a result, product deformation can be suppressed and the self-resonant frequency can be improved.

The through hole connecting portion may not have a region where all of the through hole patterns overlap when viewed from the lamination direction. As a result, it is possible to avoid the conductor of the through hole connecting portion being continuous in the lamination direction, and thus the conductor volume can be suppressed.

The plurality of through hole patterns may be classified into at least three types of a first through hole pattern, a second through hole pattern, and a third through hole pattern disposed at positions mutually shifted when viewed from the lamination direction. The coil portion forms a winding by combining the plurality of coil patterns in each layer. Accordingly, the plurality of layers have a plurality of types of coil patterns. By properly disposing the through hole patterns classified into at least three types with respect to the plurality of types of coil patterns, the through hole pattern is easily disposed at a position far from the coil pattern in each layer.

The second through hole pattern and the third through hole pattern may be connected in the lamination direction via the first through hole pattern, and the second through hole pattern and the third through hole pattern may not overlap when viewed from the lamination direction. In this case, a structure is easily configured in which the conductor volume of the through hole connecting portion is suppressed while conductivity is ensured by the first through hole pattern.

A multilayer pattern in which the second through hole pattern and the third through hole pattern are alternately disposed via the first through hole pattern may be repeated. By adopting such a repeating multilayer pattern, it is possible to simplify the variation of the combination of the coil pattern and the through hole pattern in each layer. Accordingly, it is possible to reduce the number of instruments for pattern manufacturing (such as masks) while regularly forming a layer of a combination in which the through hole pattern is disposed at a position far from the coil pattern.

One of the second through hole pattern and the third through hole pattern may be continuously disposed via the first through hole pattern. For example, in the case of a multilayer pattern in which the second through hole pattern and the third through hole pattern are adjacent to each other by adopting a coil pattern capable of improving the winding efficiency of a coil portion, it is possible to ensure conductivity while suppressing the conductor volume by intentionally adopting the multilayer pattern described above.

The through hole connecting portion may have a region where all of the through hole patterns overlap when viewed from the lamination direction. By adopting such a structure, it is possible to simplify the variation of the combination of the coil pattern and the through hole pattern in each layer and reduce the number of instruments for pattern manufacturing (such as masks).

At least two of the layers where the coil pattern and the through hole pattern have the same disposition may be continuous. In this case, the electrode cross-sectional area in the coil portion can be increased and the Q value can be improved. In addition, by the through hole pattern having the same disposition for each continuous layer in this case, it is possible to suppress an increase in the number of instruments for pattern manufacturing (such as masks).

According to the present disclosure, it is possible to provide a multilayer coil component capable of suppressing product deformation and improving the self-resonant frequency.

DETAILED DESCRIPTION

First Embodiment

Figure 1:
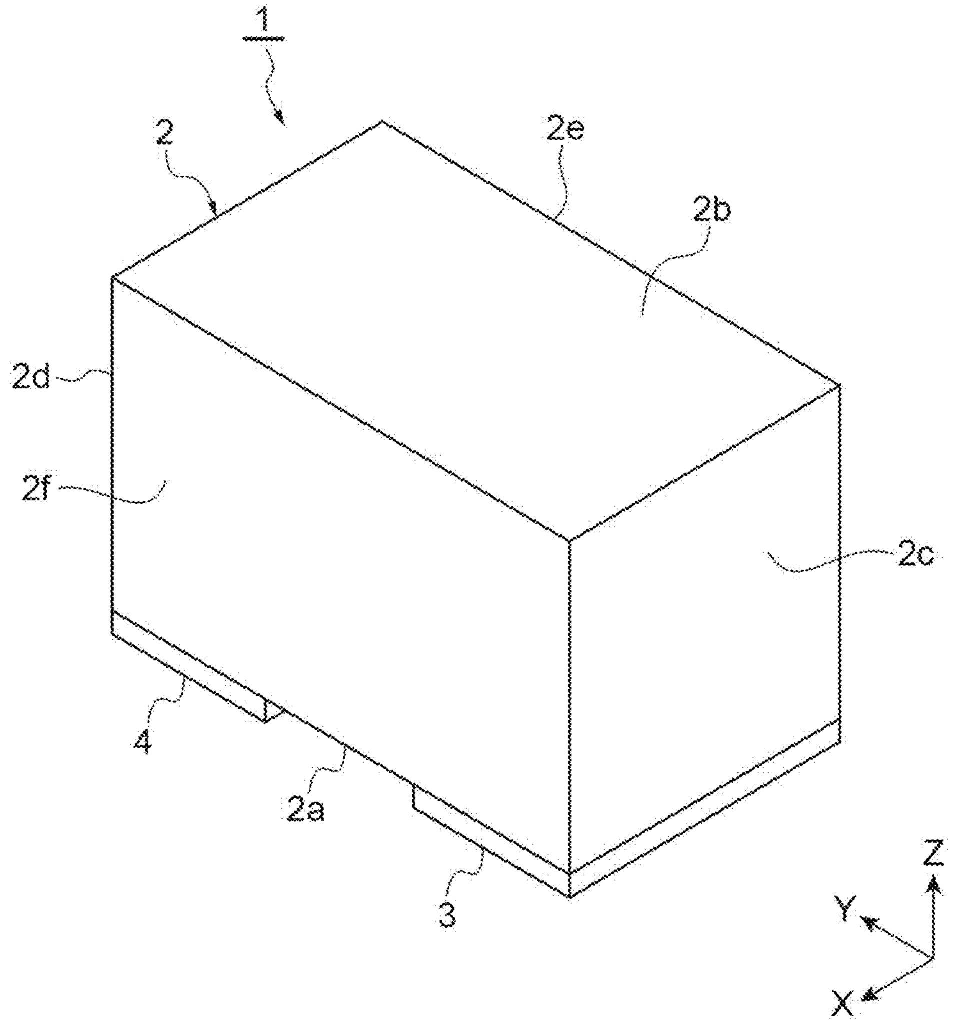
FIG. 1 is a perspective view illustrating a multilayer coil component according to a first embodiment of the present disclosure.
Figure 2:
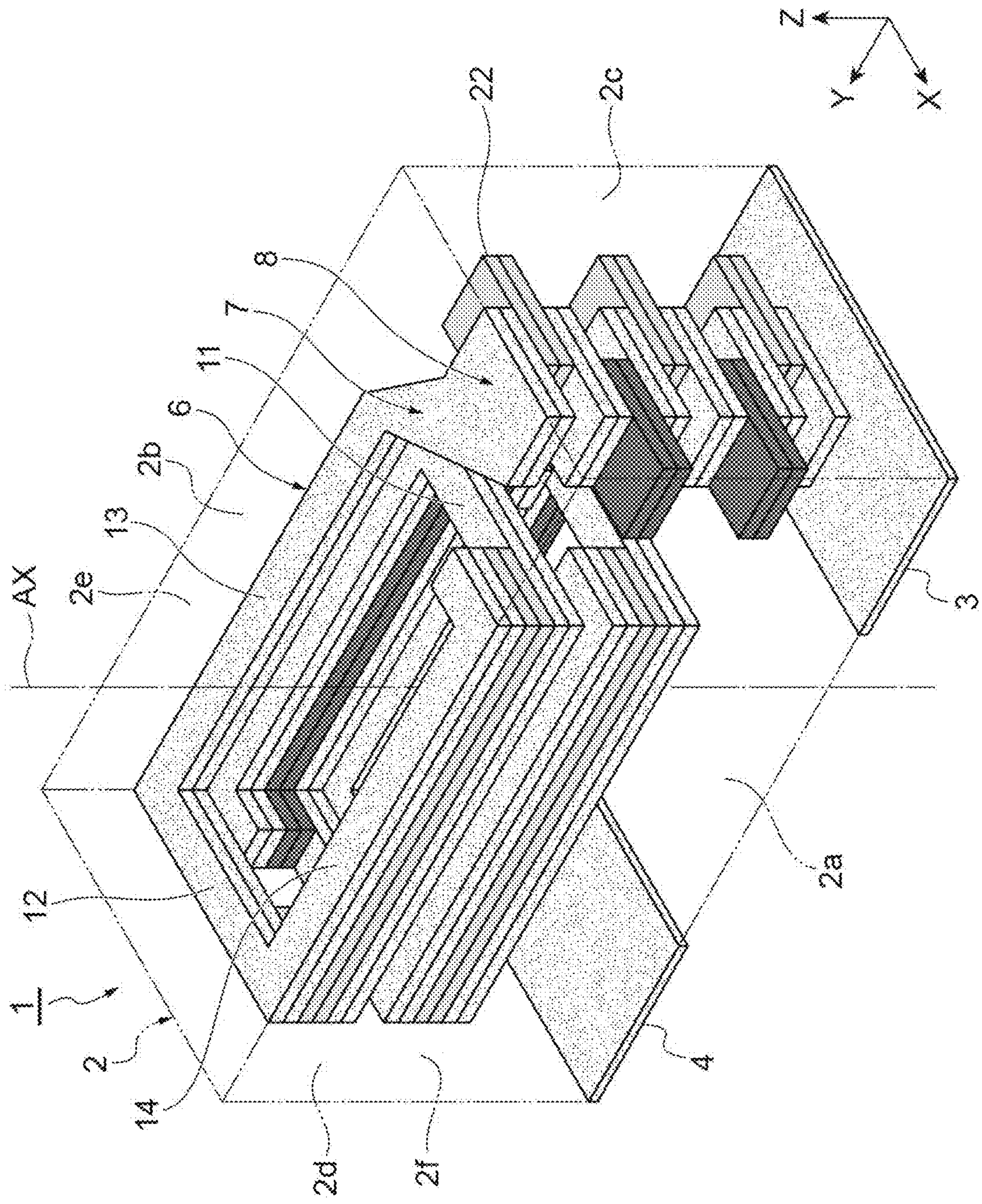
FIG. 2 is a perspective view illustrating the structure of an internal conductor, in which an element body of the multilayer coil component illustrated in FIG. 1 is omitted.
Figure 3:
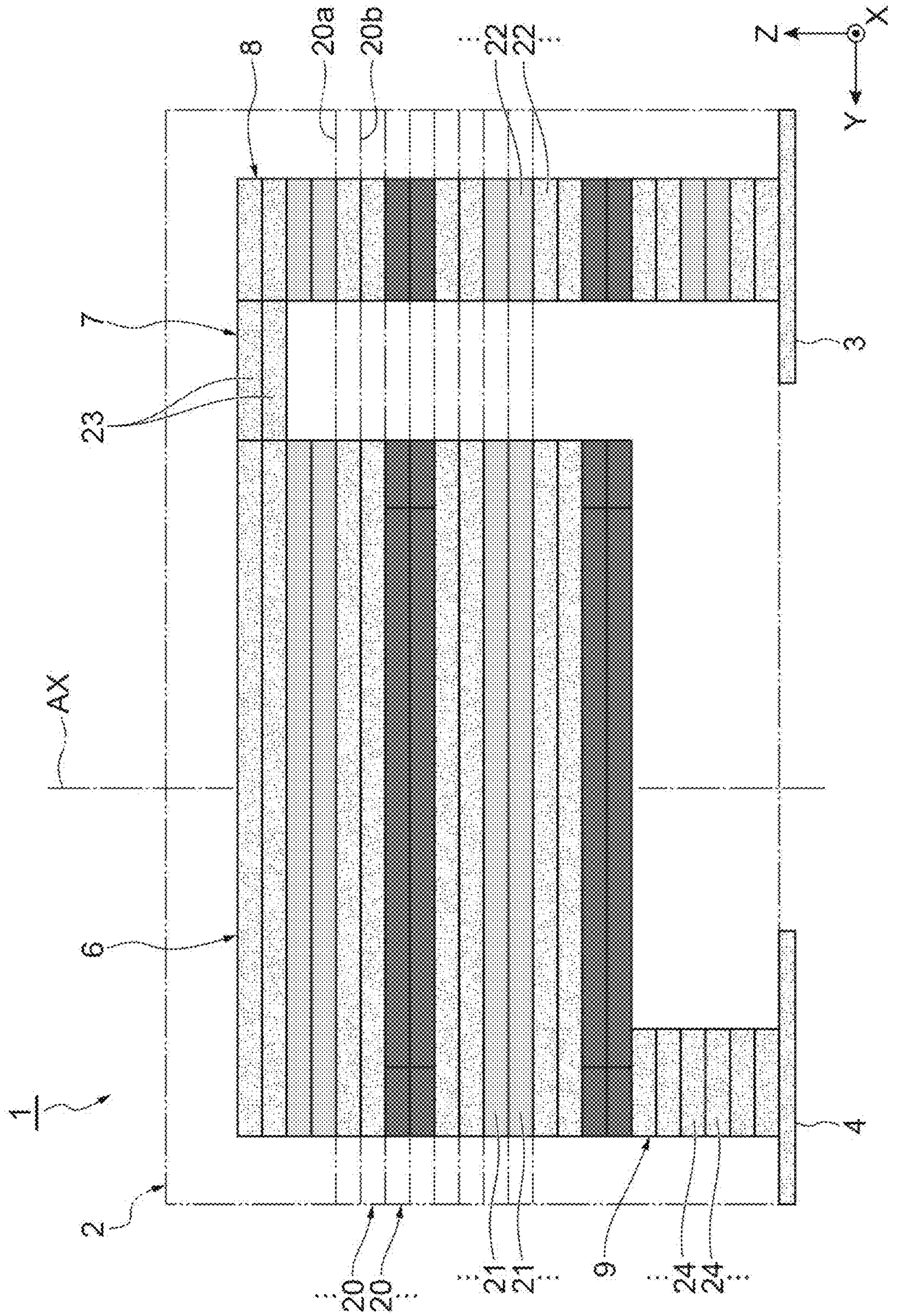
FIG. 3 is a side view in which the multilayer coil component illustrated in FIG. 2 is viewed laterally.

A multilayer coil component according to a first embodiment of the present disclosure will be described with reference to FIGS. 1 to 3. FIG. 1 is a perspective view illustrating a multilayer coil component 1 according to the first embodiment of the present disclosure. FIG. 2 is a perspective view illustrating the structure of an internal conductor, in which an element body 2 of the multilayer coil component 1 illustrated in FIG. 1 is omitted. FIG. 3 is a side view in which the multilayer coil component 1 illustrated in FIG. 2 is viewed laterally.

As illustrated in FIG. 1, the multilayer coil component 1 includes the element body 2 and external terminals 3 and 4. The element body 2 is a member formed by laminating a plurality of layers made of an insulator in a lamination direction. The element body 2 has a rectangular parallelepiped shape. XYZ coordinates may be set with respect to the multilayer coil component 1 in the following description. Here, the Z-axis direction is “lamination direction Z” in which the plurality of layers are laminated. Of the directions orthogonal to the lamination direction Z, the Y-axis direction is “longitudinal direction Y” of the element body 2 and the X-axis direction is “lateral direction X” of the element body 2. As for the lamination direction Z, the upper side is the positive side and the bottom side is the negative side. One side in the lateral direction X and one side in the longitudinal direction Y are positive sides.

The element body 2 has a bottom surface 2*a* and an upper surface 2*b* facing each other in the lamination direction Z, end surfaces 2*c* and 2*d* facing each other in the longitudinal direction Y, and side surfaces 2*e* and 2*f* facing each other in the lateral direction X. The end surface 2*c* is disposed on the negative side in the longitudinal direction Y. and the end surface 2*d* is disposed on the positive side in the longitudinal direction Y. The side surface 2*e* is disposed on the negative side in the lateral direction X, and the side surface 2*f* is disposed on the positive side in the lateral direction X. The bottom surface 2*a* is defined as, for example, a surface facing another electronic device (not illustrated) when the multilayer coil component 1 is mounted on the electronic device (such as a circuit board and an electronic component). “Upper” and “bottom” here are for convenience only and do not limit the posture during use. The material of the element body 2 is not particularly limited. An optimum material, examples of which include glass ceramics and ferrite, may be adopted depending on the application of the multilayer coil component 1.

The external terminals 3 and 4 are terminal electrodes formed on the bottom surface 2*a* of the element body 2. The external terminals 3 and 4 are joined to terminals of another electronic device when the multilayer coil component 1 is mounted. The external terminal 3 is formed in the region of the bottom surface 2*a* that is on the negative side in the longitudinal direction Y. The external terminal 4 is formed in the region of the bottom surface 2*a* that is on the positive side in the longitudinal direction Y. The external terminals 3 and 4 are disposed so as to be separated from each other in the longitudinal direction Y. The material of the external terminals 3 and 4 is not particularly limited. An optimum material, examples of which include silver and copper, may be adopted depending on the application of the multilayer coil component 1.

Next, the internal structure of the element body 2 will be described with reference to FIGS. 2 and 3. As illustrated in FIGS. 2 and 3, the multilayer coil component 1 includes a coil portion 6, a pull-out portion 7, a through hole connecting portion 8, and a through hole connecting portion 9 (see FIG. 3). The coil portion 6 is a conductor member provided in the element body 2 with a coil axis AX perpendicular to the bottom surface 2*a*. The coil portion 6 is configured by a rectangular ring-shaped winding pattern with the coil axis AX serving as a winding center. The coil portion 6 has four side portions 11, 12, 13, and 14 when viewed from the lamination direction Z. The side portion 11 extends in the lateral direction X on the negative side in the longitudinal direction Y. The side portion 12 extends in the lateral direction X on the positive side in the longitudinal direction Y. The side portion 13 extends in the longitudinal direction Y on the negative side in the lateral direction X. The side portion 14 extends in the longitudinal direction Y on the positive side in the lateral direction X.

As illustrated in FIG. 3, one end portion of the winding in the coil portion 6 is pulled out to the negative side in the longitudinal direction Y by the pull-out portion 7 at the position of the end portion on the positive side in the lamination direction Z. The pull-out portion 7 is connected to the end portion of the through hole connecting portion 8 that is on the positive side in the lamination direction Z. The through hole connecting portion 8 extends from the pull-out portion 7 to the negative side in the lamination direction Z and is connected to the external terminal 3 from the inner side of the element body 2. The other end portion of the winding in the coil portion 6 is disposed at the position of the end portion on the positive side in the longitudinal direction Y at the position of the end portion on the negative side in the lamination direction Z and is connected to the through hole connecting portion 9. The through hole connecting portion 9 extends to the negative side in the lamination direction Z and is connected to the external terminal 4 from the inner side of the element body 2.

Here, as described above, the element body 2 is formed by laminating a plurality of layers 20 in the lamination direction Z. This layer 20 is configured as a single sheet body before sintering. After sintering, the layers 20 are integrated such that the boundary portions between the layers 20 cannot be visually recognized. In FIG. 3, some of the layers 20 are indicated by virtual lines for convenience of description. Each of the plurality of layers 20 has a coil pattern 21 and a through hole pattern 22. In addition, a pull-out pattern 23 or a through hole pattern 24 for the through hole connecting portion 9 is formed depending on the layer 20. The through hole connecting portion 8 is formed by laminating a plurality of the through hole patterns 22 in the lamination direction Z. The pull-out portion 7 is formed by laminating two pull-out patterns 23 in the lamination direction Z. The through hole connecting portion 8 is formed by mutually joining a plurality of the through hole patterns 24 in the lamination direction Z.

In the present embodiment, the patterns 21, 22, 23, and 24 are formed so as to penetrate the layers 20 in the lamination direction Z. In other words, the surfaces of the patterns 21, 22, 23, and 24 on the positive side in the lamination direction Z reach surfaces 20*a* of the layers 20 on the positive side in the lamination direction Z and the surfaces of the patterns 21, 22, 23, and 24 on the negative side in the lamination direction Z reach surfaces 20*b* of the layers 20 on the negative side in the lamination direction Z. In the pre-sintering sheet body state, the surfaces of the patterns 21, 22, 23, and 24 on the positive side in the lamination direction Z are exposed from the surfaces 20*a* of the layers 20 on the positive side in the lamination direction Z and the surfaces of the patterns 21, 22, 23, and 24 on the negative side in the lamination direction Z are exposed from the surfaces 20*b* of the layers 20 on the negative side in the lamination direction Z. As a result, the patterns 21, 22, 23, and 24 can be directly joined to the patterns 21, 22, 23, and 24 that are adjacent to the patterns 21, 22, 23, and 24 in the lamination direction Z.

Figure 4:
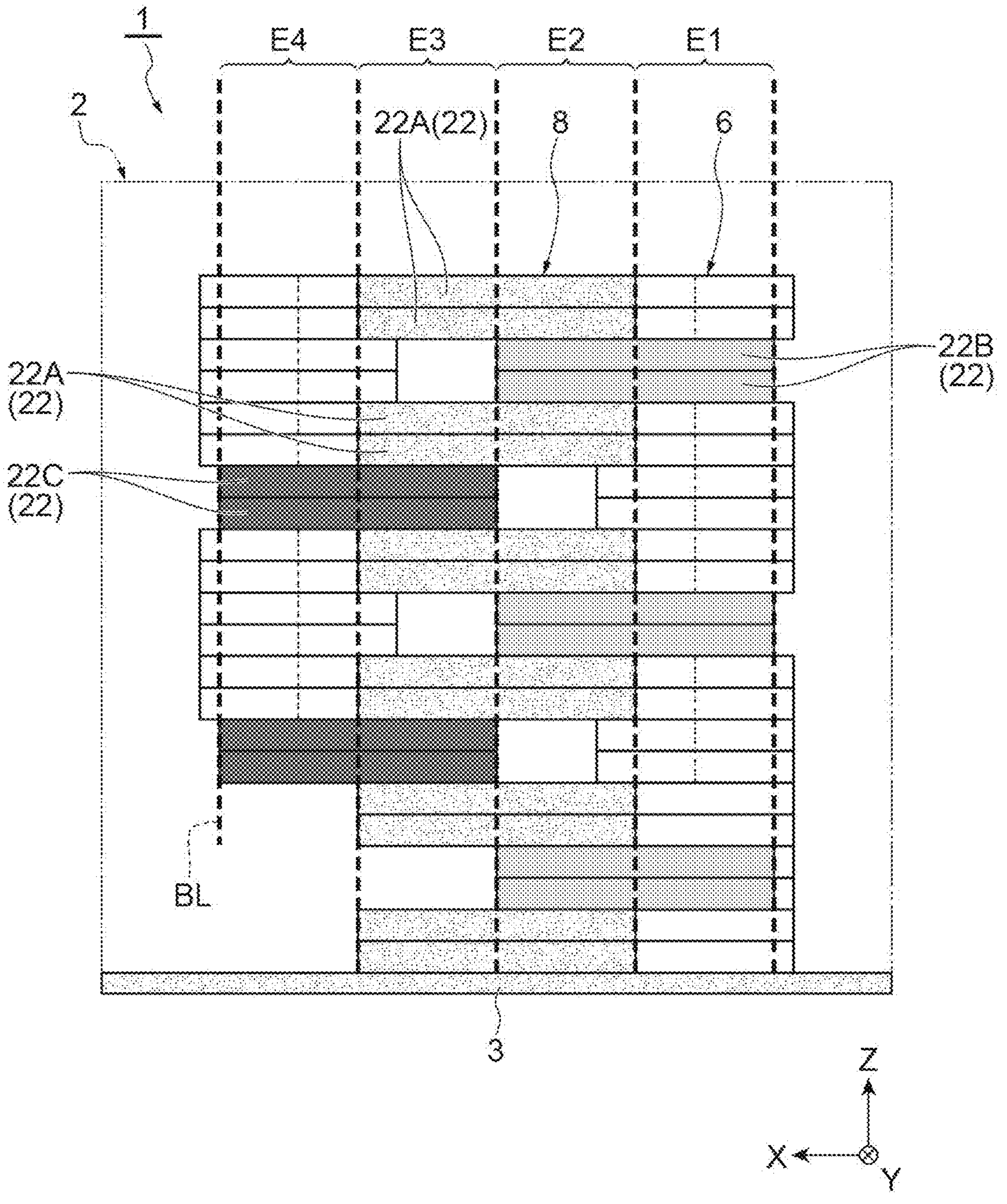
FIG. 4 is a side view in which the multilayer coil component illustrated in FIG. 2 is viewed from the negative side to the positive side in a longitudinal direction Y.

FIG. 4 is a side view in which the multilayer coil component 1 illustrated in FIG. 2 is viewed from the negative side to the positive side in the longitudinal direction Y. In the following description, the negative side in the lateral direction X may be referred to as "right" and the positive side in the lateral direction X may be referred to as "left", which is for convenience of description, with reference to the viewpoint of the state illustrated in FIG. 4. In addition, the negative side in the longitudinal direction Y may be referred to as "front" and the positive side in the longitudinal direction Y may be referred to as "back" with reference to the position from the through hole pattern 22.

The plurality of through hole patterns 22 are classified into the three types of middle through hole patterns 22A (first through hole patterns) disposed at the middle position in the lateral direction X, right-sided through hole patterns 22B (second through hole patterns) disposed to the right, and left-sided through hole patterns 22C (third through hole patterns) disposed to the left. These three types of through hole patterns 22A, 22B, and 22C have the same length in the lateral direction X and are at different positions in the lateral direction X. Accordingly, in terms of relationship, the through hole patterns 22A, 22B, and 22C are disposed at positions mutually shifted when viewed from the lamination direction Z. The through hole patterns 22A, 22B, and 22C are not shifted in the longitudinal direction Y (see FIG. 3).

A multilayer pattern will be described. Describing in order from the positive side to the negative side in the lamination direction Z, a multilayer pattern of the middle through hole pattern 22A, the right-sided through hole pattern 22B, the middle through hole pattern 22A, and the left-sided through hole pattern 22C is established and the multilayer pattern is repeated. In other words, a multilayer pattern in which the right-sided through hole pattern 22B and the left-sided through hole pattern 22C are alternately disposed via the middle through hole pattern 22A is repeated.

The left end portion of the right-sided through hole pattern 22B is disposed at the middle position of the middle through hole pattern 22A. The right end portion of the left-sided through hole pattern 22C is disposed at the middle position of the middle through hole pattern 22A. Accordingly, the left end portion of the right-sided through hole pattern 22B and the right end portion of the left-sided through hole pattern 22C coincide when viewed from the lamination direction Z, and thus the left end portion of the right-sided through hole pattern 22B and the right end portion of the left-sided through hole pattern 22C are disposed so as not to overlap when viewed from the lamination direction Z. Accordingly, the middle through hole pattern 22A is always interposed between the right-sided through hole pattern 22B and the left-sided through hole pattern 22C, and thus the electrical connectivity of the through hole connecting portion 8 is ensured.

Further, with such a configuration, the through hole connecting portion 8 can be configured so as not to have a region where all of the through hole patterns 22 overlap when viewed from the lamination direction Z. Specifically, setting of boundary lines BL at the positions of the end portions of the through hole patterns 22A, 22B, and 22C results in division into four regions E1, E2, E3, and E4 in order from the right. Only the right-sided through hole pattern 22B is in the region E1. The middle through hole pattern 22A and the right-sided through hole pattern 22B are in the region E2, which lacks the left-sided through hole pattern 22C. The middle through hole pattern 22A and the left-sided through hole pattern 22C are in the region E3, which lacks the right-sided through hole pattern 22B. Only the left-sided through hole pattern 22C is in the region E4. In this manner, each of the regions E1, E2, E3, and E4 is a region where at least one type of through hole pattern 22 is removed and is not a region where all of the three types of through hole patterns 22 are laminated. As a result of the above, the through hole patterns 22 do not overlap without exception in the through hole connecting portion 8.

Next, the shape of the pattern in each of the layers 20 will be described with reference to FIGS. 5A, 5B, 5C, 5D, 5E, 5F, and 6. The simple term of "middle position" in the following description means a position on a center line CL passing through the coil axis AX and extending parallel to the longitudinal direction Y (see FIG. 5A).

The multilayer coil component 1 according to the present embodiment is configured by one type (not illustrated) of layer 20 having the right-sided through hole pattern 22B and the through hole pattern 24, which will be described later, in addition to six types of layers 20, which are of Types 1 to 6 illustrated in order in FIGS. 5A, 5B, 5C, 5D, 5E, and 5F.

Figure 5A:
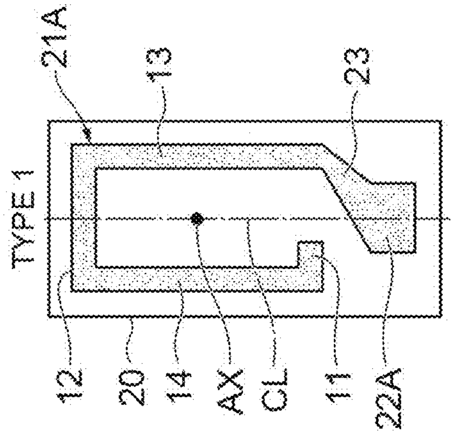
FIGS. 5A, 5B, 5C, 5D, 5E, and 5F are diagrams illustrating the structures of different types of layers.
Figure 5B:
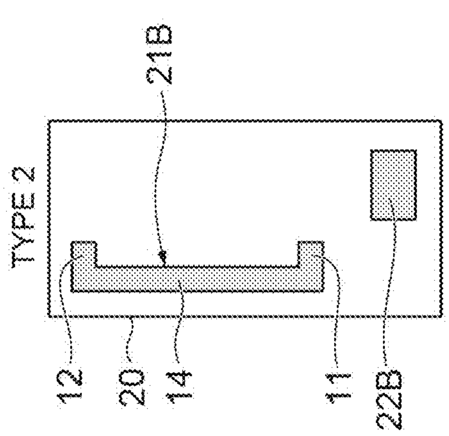
Figure 5C:
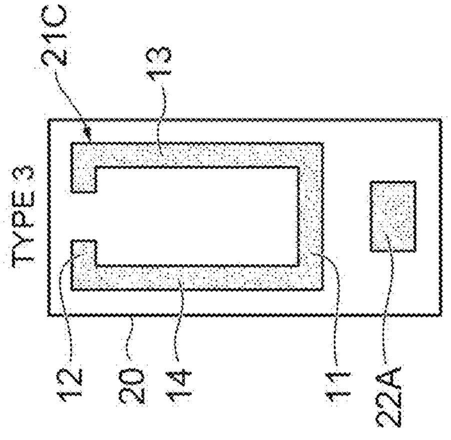

As illustrated in FIG. 5A, the Type 1 layer 20 has a coil pattern 21A, the pull-out pattern 23, and the middle through hole pattern 22A. The coil pattern 21A has the entire length of the side portions 12, 13, and 14 with the side portion 11 on the front side having only the left end portion. As illustrated in FIG. 5B, the Type 2 layer 20 has a left-sided coil pattern 21B and the right-sided through hole pattern 22B. The left-sided coil pattern 21B has the entire length of the left side portion 14 and has only the left end portions of the side portions 11 and 12. As illustrated in FIG. 5C, the Type 3 layer 20 has a coil pattern 21C and the middle through hole pattern 22A. The coil pattern 21C has the entire length of the side portions 11, 13, and 14 with the side portion 12 on the back side open in the middle and having only the left and right end portions. The coil pattern 21C is bilaterally symmetrical.

Figure 5D:
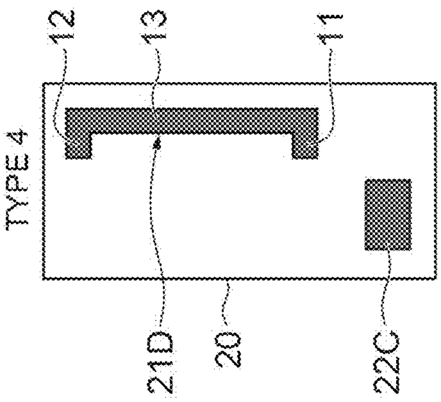
Figure 5E:
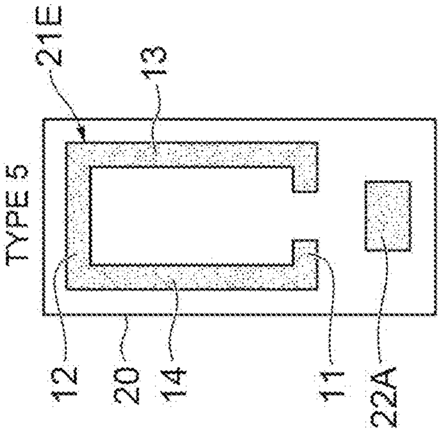
Figure 5F:
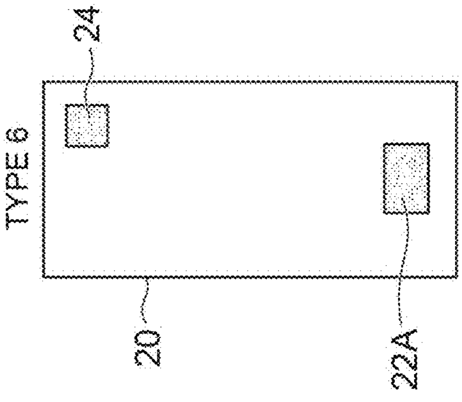

As illustrated in FIG. 5D, the Type 4 layer 20 has a right-sided coil pattern 21D and the left-sided through hole pattern 22C. The right-sided coil pattern 21D has the entire length of the right side portion 13 and has only the right end portions of the side portions 11 and 12. As illustrated in FIG. 5E, the Type 5 layer 20 has a coil pattern 21E and the middle through hole pattern 22A. The coil pattern 21E has the entire length of the side portions 12, 13, and 14 with the side portion 11 on the front side open in the middle and having only the left and right end portions. The coil pattern 21E is bilaterally symmetrical. As illustrated in FIG. 5F, the Type 6 layer 20 has the middle through hole pattern 22A and the through hole pattern 24. The layer 20 having the through hole pattern 24 may be of the type having the right-sided through hole pattern 22B.

In the Type 2 layer 20 of FIG. 5B, the coil pattern 21B is to the left. As for the side portion 11, a conductor is only to the left of the middle position. On the other hand, the right-sided through hole pattern 22B is formed in the same layer 20. In the Type 2 layer 20 of FIG. 5D, the coil pattern 21D is to the right. As for the side portion 11, a conductor is only to the right of the middle position. On the other hand, the left-sided through hole pattern 22C is formed in the same layer 20. Accordingly, in the Type 2 and Type 4 layers 20, the through hole pattern 22 can be disposed at a position as far as possible from the coil pattern 21. As a result, the stray capacitance between the through hole pattern 22 and the coil pattern 21 can be reduced. A disposition in which the two are separated from each other as much as possible in this manner may be referred to as "improved disposition". In the Type 3 layer 20, the side portion 11 is formed over the entire length. In the Type 5 layer 20, the notch of the side portion 11 is bilateral symmetrical. Accordingly, the through hole pattern 22 cannot be disposed far from the coil pattern 21 regardless of whether the through hole pattern 22 is moved to the left or right. Accordingly, the middle through hole pattern 22A as a pattern ensuring the connectivity of the through hole connecting portion 8 is formed in the Type 3 and Type 5 layers 20. A disposition that cannot be made into the improved disposition or a disposition that is not made into the improved disposition as a pattern that can be made into the improved disposition may be referred to as "normal disposition".

With such a configuration, the through hole pattern 22 in at least one "first layer" among the plurality of layers 20 can be shifted, when viewed from the lamination direction Z, with respect to the through hole pattern 22 in another "second layer". Further, when viewed from the lamination direction Z, the distance between the through hole pattern 22 in "first layer" and the coil pattern 21 in "first layer" can be configured to be farther than the distance between the through hole pattern 22 in "second layer" and the coil pattern 21 in "first layer". The distance here is the shortest distance at the point where the through hole pattern 22 and the coil pattern 21 are closest to each other.

Specifically, the Type 2 layer 20 is regarded as "first layer" and Types 3, 4, and 5 are regarded as "second layers". Then, the right-sided through hole pattern 22B of the Type 2 layer 20 is shifted, when viewed from the lamination direction Z, with respect to the through hole patterns 22A and 22C of the layers 20 of Types 3, 4, and 5. When viewed from the lamination direction Z, a relationship is established in which the distance between the right-sided through hole pattern 22B of the Type 2 layer 20 and the coil pattern 21B of the Type 2 layer 20 is farther than the distance between the through hole patterns 22A and 22C in the layers 20 of Types 3, 4, and 5 and the coil pattern 21 of the Type 2 layer 20.

The Type 4 layer 20 is regarded as "first layer" and Types 2, 3, and 5 are regarded as "second layers". Then, the left-sided through hole pattern 22C of the Type 4 layer 20 is shifted, when viewed from the lamination direction Z, with respect to the through hole patterns 22A and 22B of the layers 20 of Types 2, 3, and 5. When viewed from the lamination direction Z, a relationship is established in which the distance between the left-sided through hole pattern 22C of the Type 4 layer 20 and the coil pattern 21D of the Type 4 layer 20 is farther than the distance between the through hole patterns 22A and 22B in the layers 20 of Types 2, 3, and 5 and the coil pattern 21 of the Type 2 layer 20.

Although the above relationship is not established even if the Type 3 and 5 layers 20 are regarded as "first layers" and Types 2 and 4 are regarded as "second layers" with the relationship between "first layer" and "second layer" reversed, the above relationship does not need to be established even in a case where the layers 20 regarded as "first layer" and "second layer" are reversed. In other words, the above relationship being satisfied when the layer 20 of any type is regarded as "first layer" is included in the configuration limited by the claims.

Figure 6:
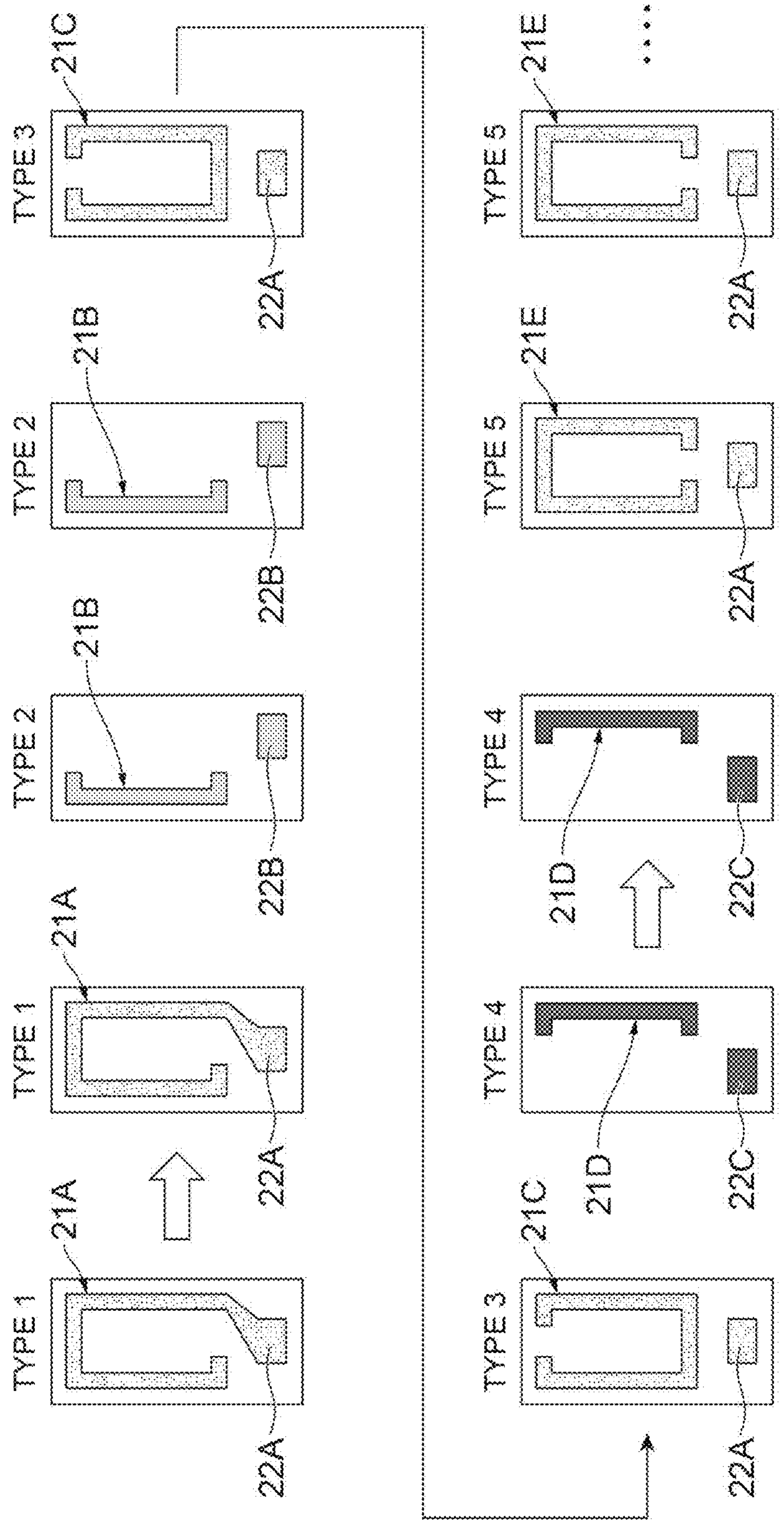
FIG. 6 is a schematic diagram illustrating the order of layer lamination for coil portion formation.

FIG. 6 illustrates the lamination order of the layers 20 for forming the coil portion 6. The arrows in FIG. 6 indicate the order from the positive side to the negative side in the lamination direction Z. As illustrated in FIG. 6, two layers of Type 1 layer 20, two layers of Type 2 layer 20, two layers of Type 3 layer 20, two layers of Type 4 layer 20, and two layers of Type 5 layer 20 are laminated in this order. Then, the same multilayer pattern is repeated from two layers of Type 2. In this form, two layers 20 are continuous with the coil pattern 21 and the through hole pattern 22 having the same disposition. In other words, two layers 20 of the same type are continuous. In addition, a coil for one round is formed by four types of coil patterns 21, that is, the coil patterns 21B, 21C, 21D, and 21E.

Next, the action and effect of the multilayer coil component 1 according to the present embodiment will be described.

The multilayer coil component 1 according to the present embodiment includes the coil portion 6 where the coil axis AX is perpendicular to the bottom surface 2*a* and the external terminals 3 and 4 formed on the bottom surface 2*a* of the element body 2. Accordingly, the end portion of the coil portion 6 disposed at a position higher than the bottom surface 2*a* and the external terminal 3 of the bottom surface 2*a* need to be electrically connected by the through hole connecting portion 8. The through hole connecting portion 8 is formed by mutually joining the plurality of through hole patterns 22 in the lamination direction Z, and thus an increase in conductor volume is likely to occur. On the other hand, in the present embodiment, the through hole pattern 22 in at least one "first layer" among the plurality of layers 20 (for example, the right-sided through hole pattern 22B or the left-sided through hole pattern 22C) is shifted, when viewed from the lamination direction Z, with respect to the through hole pattern 22 in another "second layer" (for example, the middle through hole pattern 22A). By the through hole pattern 22 being shifted in this manner, it is possible to suppress the conductor volume that is attributable to joining the plurality of through hole patterns 22 while ensuring conductivity in the lamination direction Z. As a result, an increase in conductor volume in the through hole connecting portion 8 can be suppressed and product deformation can be suppressed. In addition, when viewed from the lamination direction Z, the distance between the through hole pattern 22 in "first layer" (for example, the right-sided through hole pattern 22B or the left-sided through hole pattern 22C) and the coil pattern 21 in "first layer" (for example, the left-sided coil pattern 21B or the right-sided coil pattern 21D) is farther than the distance between the through hole pattern 22 in "second layer" (for example, the middle through hole pattern 22A) and the coil pattern 21 in "first layer". In "first layer" of such a configuration, the through hole pattern 22 can be disposed at a position as far as possible from the coil pattern 21 in the same layer (see, for example, the Type 2 and 4 layers 20 in FIGS. 5B and 5D). Accordingly, the effect of the stray capacitance between the through hole pattern 22 and the coil pattern 21 can be suppressed and the self-resonant frequency can be improved. As a result, product deformation can be suppressed and the self-resonant frequency can be improved.

The through hole connecting portion 8 may not have a region where all of the through hole patterns 22 overlap (for example, the region E2 in FIG. 13) when viewed from the lamination direction Z. As a result, it is possible to avoid the conductor of the through hole connecting portion 8 being continuous in the lamination direction Z, and thus the conductor volume can be suppressed.

The plurality of through hole patterns 22 may be classified into the at least three types of the middle through hole pattern 22A, the right-sided through hole pattern 22B, and the left-sided through hole pattern 22C disposed at positions mutually shifted when viewed from the lamination direction Z. The coil portion 6 forms a winding by combining the plurality of coil patterns 21 in each layer 20. Accordingly, the plurality of layers 20 have a plurality of types of coil patterns 21 (four types in the present embodiment). By properly disposing the through hole patterns 22A, 22B, and 22C classified into at least three types with respect to the plurality of types of coil patterns 21, the through hole pattern 22 is easily disposed at a position far from the coil pattern 21 in each layer 20.

The right-sided through hole pattern 22B and the left-sided through hole pattern 22C may be connected in the lamination direction Z via the middle through hole pattern 22A, and the right-sided through hole pattern 22B and the left-sided through hole pattern 22C may not overlap when viewed from the lamination direction Z. In this case, a structure is easily configured in which the conductor volume of the through hole connecting portion 8 is suppressed while conductivity is ensured by the middle through hole pattern 22A.

At least two layers 20 may be continuous with the coil pattern 21 and the through hole pattern 22 having the same disposition. In this case, the electrode cross-sectional area in the coil portion 6 can be increased and the Q value can be improved. In addition, by the through hole pattern 22 having the same disposition for each continuous layer 20 in this case, it is possible to suppress an increase in the number of instruments for pattern manufacturing (such as masks).

Second Embodiment

Figure 7:
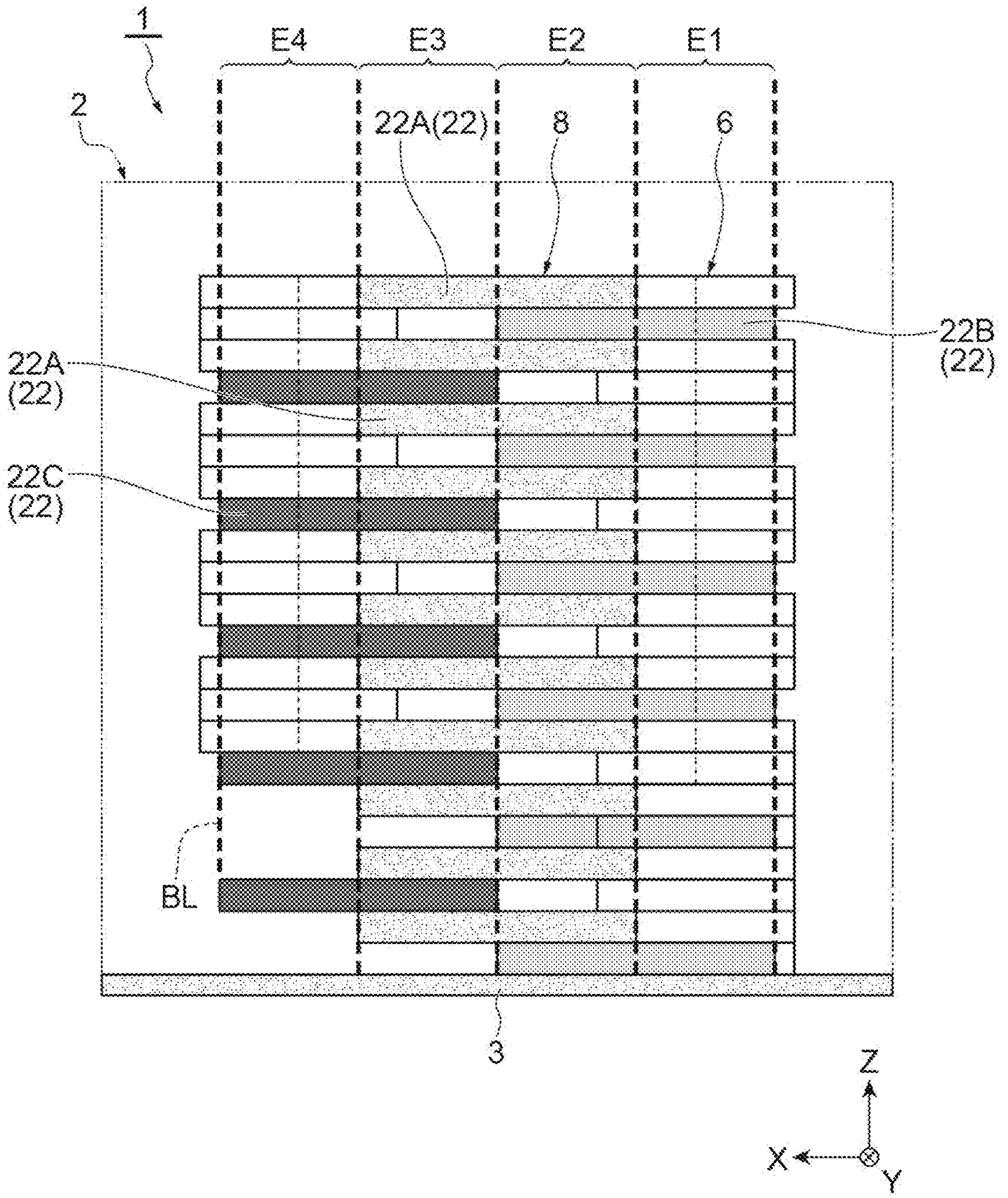
FIG. 7 is a side view in which a multilayer coil component according to a second embodiment is viewed laterally.

The multilayer coil component 1 according to a second embodiment will be described with reference to FIGS. 7 and 8. The multilayer coil component 1 according to the second embodiment is different from the multilayer coil component 1 according to the first embodiment in that the layers 20 of each type are not continuous in two layers and another type of layer 20 is laminated so as to be adjacent with respect to the layer 20 per layer. Accordingly, as illustrated in FIG. 7, a multilayer pattern of one layer of middle through hole pattern 22A, one layer of right-sided through hole pattern 22B, one layer of middle through hole pattern 22A, and one layer of left-sided through hole pattern 22C is repeated in this configuration. It is a matter of course that the coil pattern is also switched in type for each layer. The other configurations are the same as those of the multilayer coil component 1 according to the first embodiment.

Figure 8:
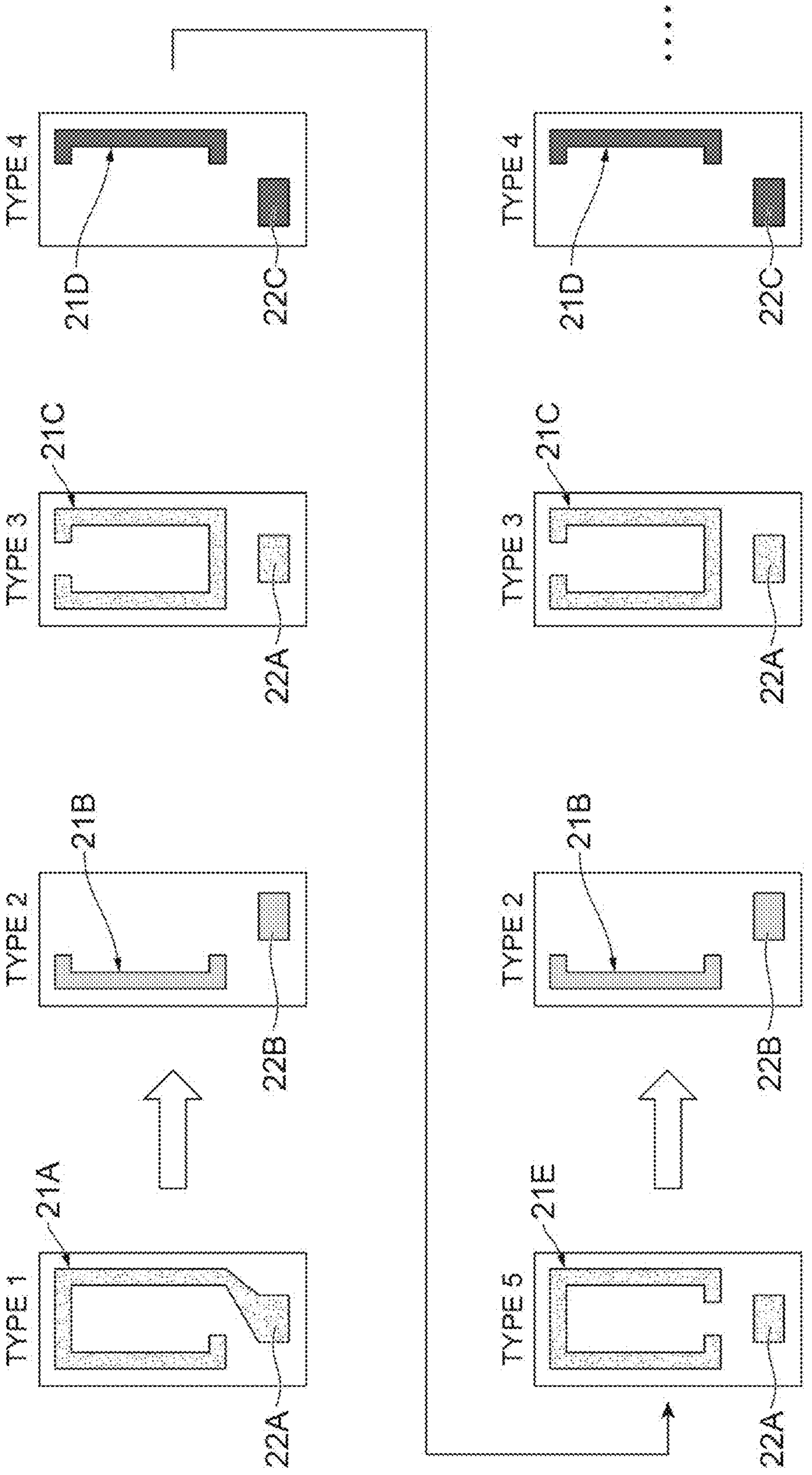
FIG. 8 is a schematic diagram illustrating the order of layer lamination in the second embodiment.

As illustrated in FIG. 8, one layer of Type 1 layer 20, one layer of Type 2 layer 20, one layer of Type 3 layer 20, one layer of Type 4 layer 20, and one layer of Type 5 layer 20 are laminated in this order. Then, the same multilayer pattern is repeated from one layer of Type 2. In the multilayer coil component 1 according to the second embodiment, the type of the through hole pattern 22 is switched for each layer in this manner, and thus the conductor volume of the through hole connecting portion 8 can be further dispersed.

Third Embodiment

Figure 9:
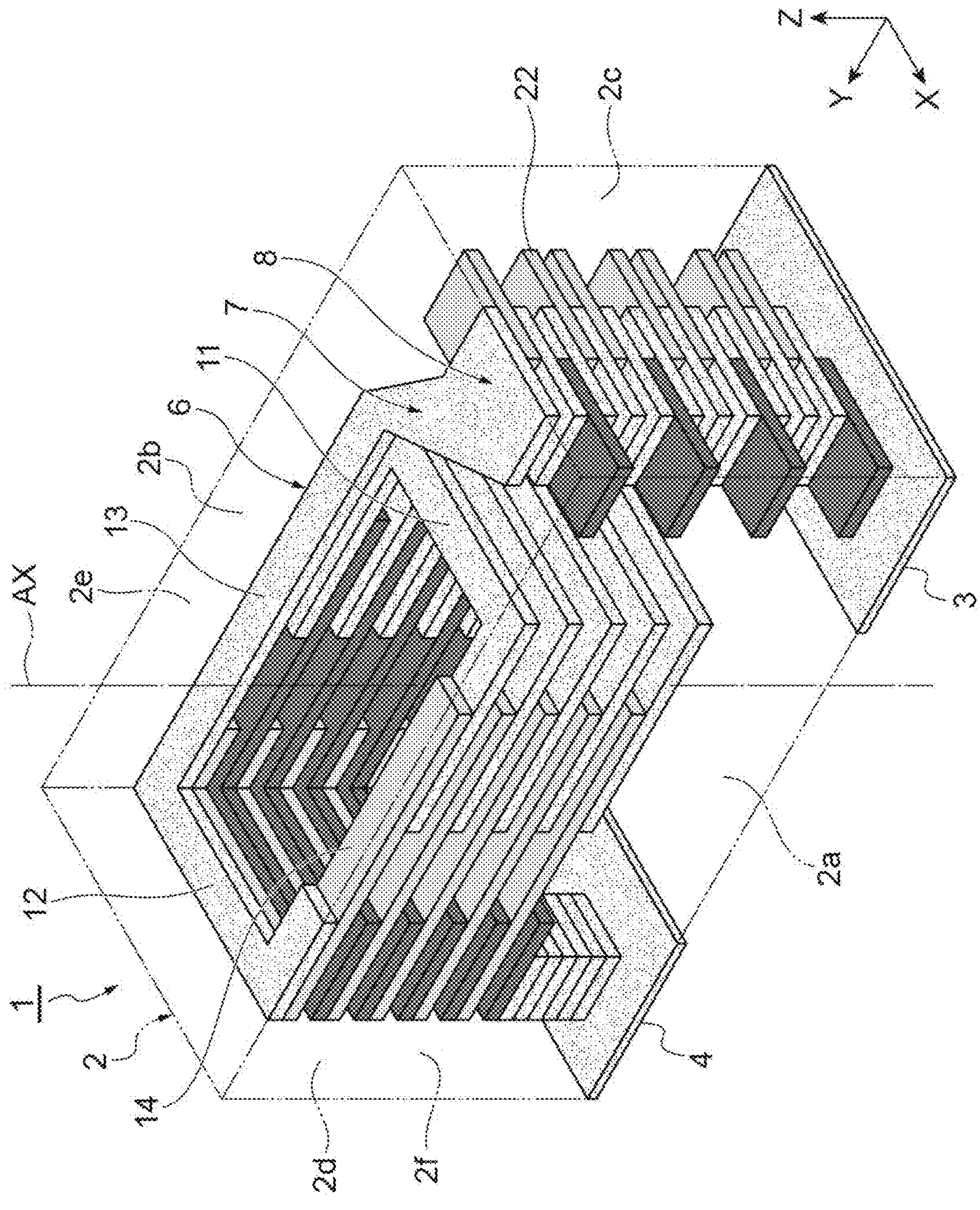
FIG. 9 is a perspective view illustrating the structure of an internal conductor, in which an element body of a multilayer coil component according to a third embodiment is omitted.

The multilayer coil component 1 according to a third embodiment will be described with reference to FIGS. 9 to 11. The main difference between the multilayer coil components 1 of the first and third embodiments is that a coil for one round in the third embodiment is formed by three types of coil patterns 21 as illustrated in FIG. 11 whereas a coil for one round in the first embodiment is formed by four types of coil patterns 21. As a result, the efficiency of coil winding is enhanced as compared with the first and second embodiments, and thus the number of turns can be increased and high inductance can be obtained. However, adoption of the coil pattern 21 leads to a point where the through hole pattern 22 is incapable of performing conduction. Accordingly, a multilayer pattern of the through hole pattern 22 is devised in the multilayer coil component 1 according to the third embodiment (described in detail later).

As illustrated in FIG. 11, the layer 20 of Type 1-1 has a coil pattern 21Az, the pull-out pattern 23, and the middle through hole pattern 22A. The coil pattern 21Az has the entire length of the side portions 12 and 13 with the left side portion 14 having only the end portion on the back side. The layer 20 of Type 2-1 has a left-sided coil pattern 21Bz and the right-sided through hole pattern 22B. The left-sided coil pattern 21Bz has the entire length of the side portion 12 on the back side and the left side portion 14 extended to the front side and has only the end portion on the back side of the side portion 13 on the right side. The layer 20 of Type 3-1 has a coil pattern 21Cz and the middle through hole pattern 22A. The coil pattern 21Cz has the entire length of the side portion 11 on the front side and has the side portions 14 and 13 on the left and right sides extended to the back side. The coil pattern 21Cz is bilaterally symmetrical. The layer 20 of Type 4-1 has a right-sided coil pattern 21Dz and the left-sided through hole pattern 22C. The right-sided coil pattern 21Dz has the entire length of the side portion 12 on the back side, has the side portion 13 on the right side extended to the front side, and has only the end portion on the back side of the side portion 14 on the left side.

The layer 20 of Type 2-2 has a coil pattern 21Bz and the middle through hole pattern 22A. The layer 20 of Type 3-2 has the coil pattern 21Cz and the right-sided through hole pattern 22B. The layer 20 of Type 4-2 has a coil pattern 21Dz and the middle through hole pattern 22A.

In the third embodiment, the Type 1-1 layer 20, the Type 2-1 layer 20, the Type 3-1 layer 20, the Type 4-1 layer 20, the Type 2-2 layer 20, the Type 3-2 layer 20, and the Type 4-2 layer 20 are laminated in this order. Then, the same multilayer pattern is repeated from Type 2-1. Here, although adopting three types of coil patterns as in the third embodiment leads to a part where the right-sided coil pattern 21Dz and the left-sided coil pattern 21Bz are continuous (points of Type 4-1 and Type 2-2), the left-sided through hole pattern 22C and the right-sided through hole pattern 22B become adjacent to each other and conduction becomes impossible if Type 2-2 is the improved disposition. Even so, overlapping the left-sided through hole pattern 22C and the right-sided through hole pattern 22B leads to a region where all of the through hole patterns 22 overlap in the lamination direction Z. Accordingly, in the Type 2-2 layer 20, the middle through hole pattern 22A is a normal disposition intentionally. Likewise, in the Type 4-2 layer 20, the middle through hole pattern 22A is a normal disposition intentionally. In addition, in Type 3-2, the right-sided through hole pattern 22B is adopted in order to suppress a volume increase between the middle through hole patterns 22A of Type 2-2 and Type 4-2 although the pattern is not kept away from the coil pattern 21Cz and corresponds to a normal disposition.

Figure 10:
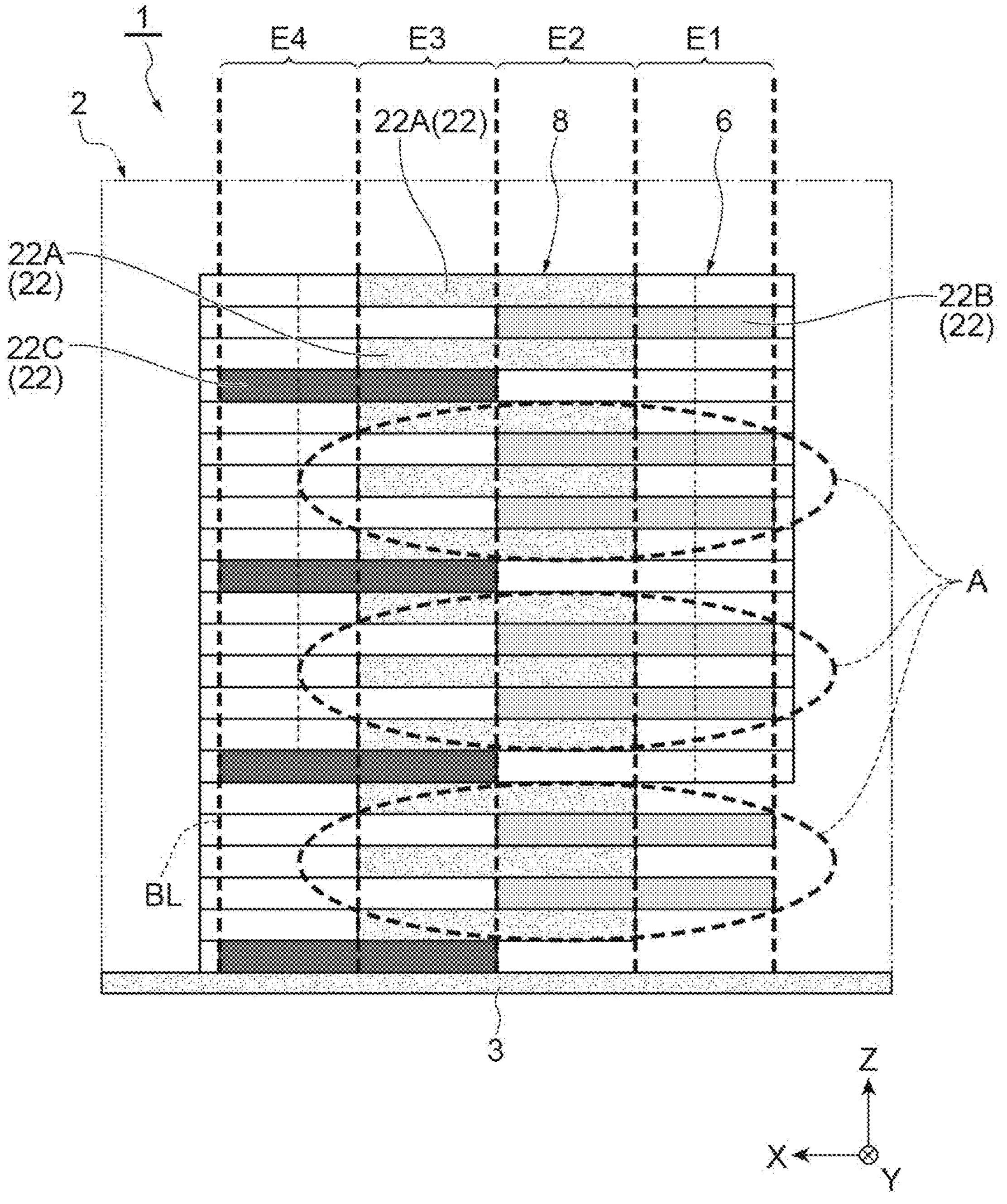
FIG. 10 is a side view in which the multilayer coil component according to the third embodiment is viewed laterally.
Figure 11:
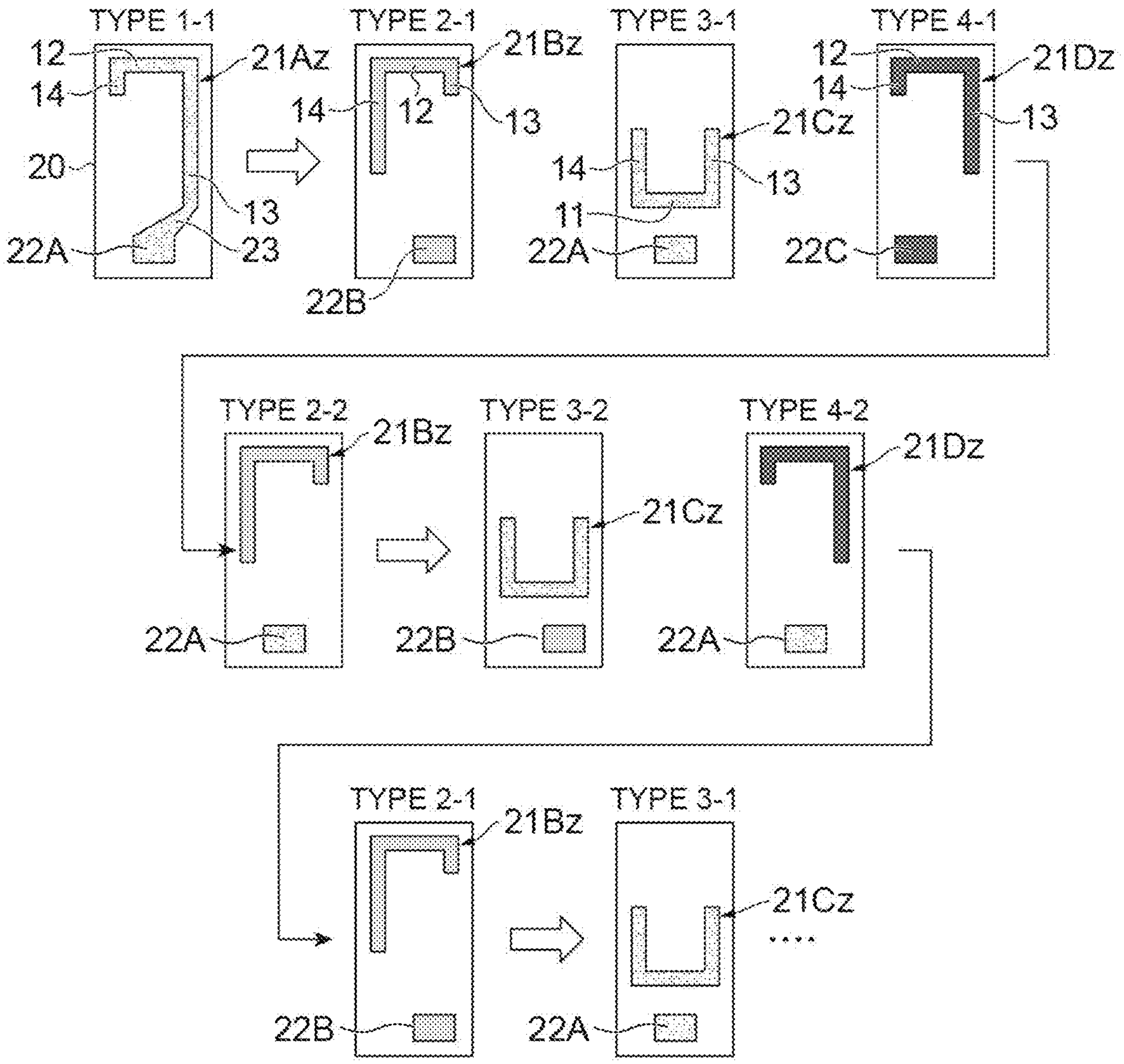
FIG. 11 is a schematic diagram illustrating the order of layer lamination in the third embodiment.

As a result, the multilayer pattern of the through hole pattern 22 becomes as illustrated in FIG. 10. As illustrated in FIG. 10, in the multilayer pattern, the right-sided through hole patterns 22B are continuously disposed via the middle through hole patterns 22A (see the "A" parts surrounded by broken lines). The left-sided through hole patterns 22C may be continuous although the right-sided through hole patterns 22B are continuous in the third embodiment.

As described above, one of the right-sided through hole pattern 22B and the left-sided through hole pattern 22C may be continuously disposed via the middle through hole pattern 22A. Although adopting three types of coil patterns 21 capable of improving the winding efficiency of the coil portion 6 as in the third embodiment leads to a multilayer pattern in which the right-sided through hole pattern 22B and the left-sided through hole pattern 22C are adjacent to each other, it is possible to ensure conductivity while suppressing the conductor volume by intentionally adopting the above multilayer pattern. In addition, as for the layer 20 capable of becoming the improved disposition (Types 2-1 and 4-1 here), the effect of stray capacitance reduction can also be obtained by adopting the improved disposition.

Fourth Embodiment

Figure 12:
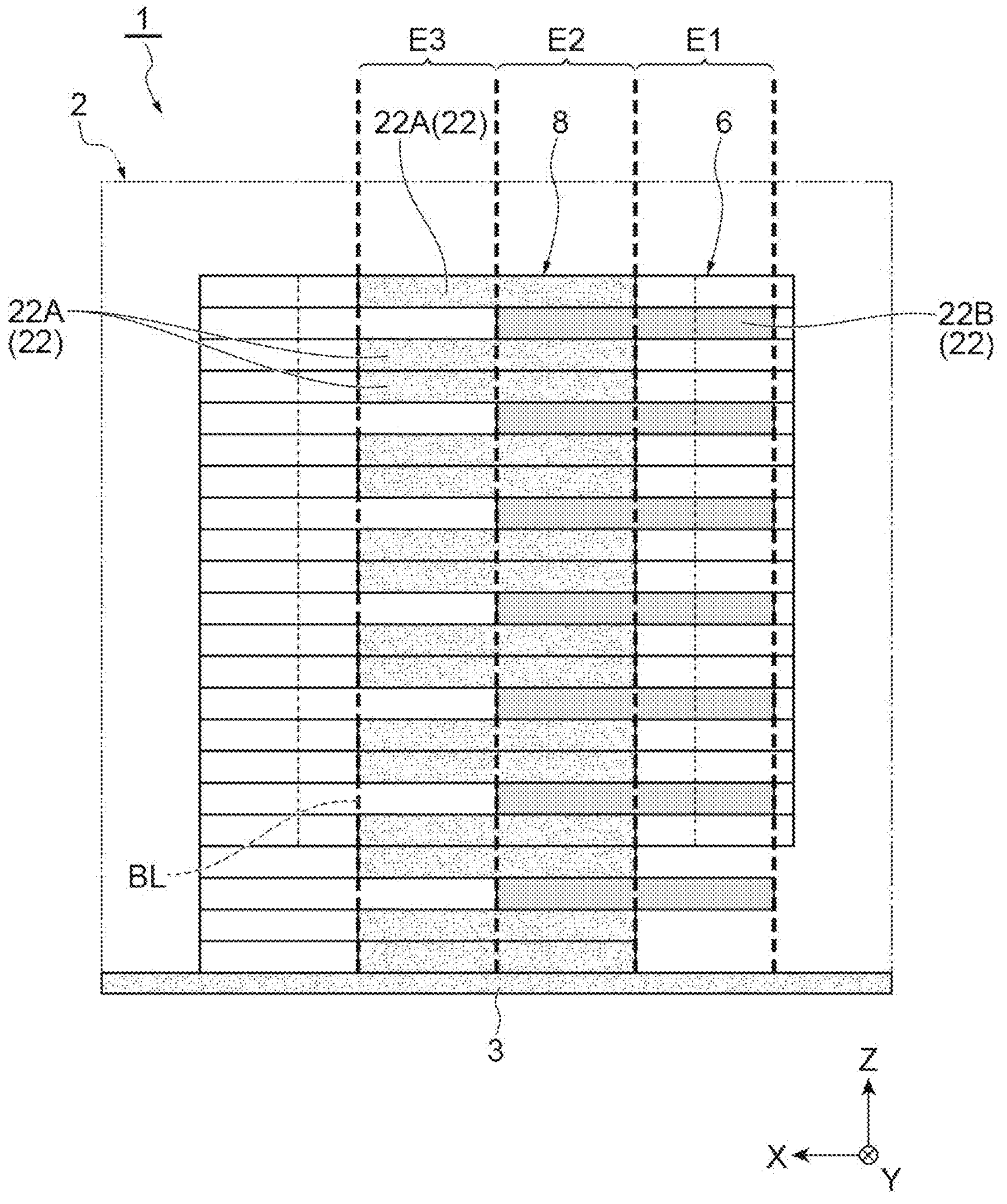
FIG. 12 is a side view in which a multilayer coil component according to a fourth embodiment is viewed laterally.

The multilayer coil component 1 according to a fourth embodiment will be described with reference to FIGS. 12 and 13. The main difference between the multilayer coil components 1 according to the fourth and third embodiments is that a multilayer pattern of the through hole pattern 22 different from that of the third embodiment is adopted in the fourth embodiment. As illustrated in FIG. 12, in the fourth embodiment, the through hole connecting portion 8 is configured by two types of through hole patterns 22.

Figure 13:
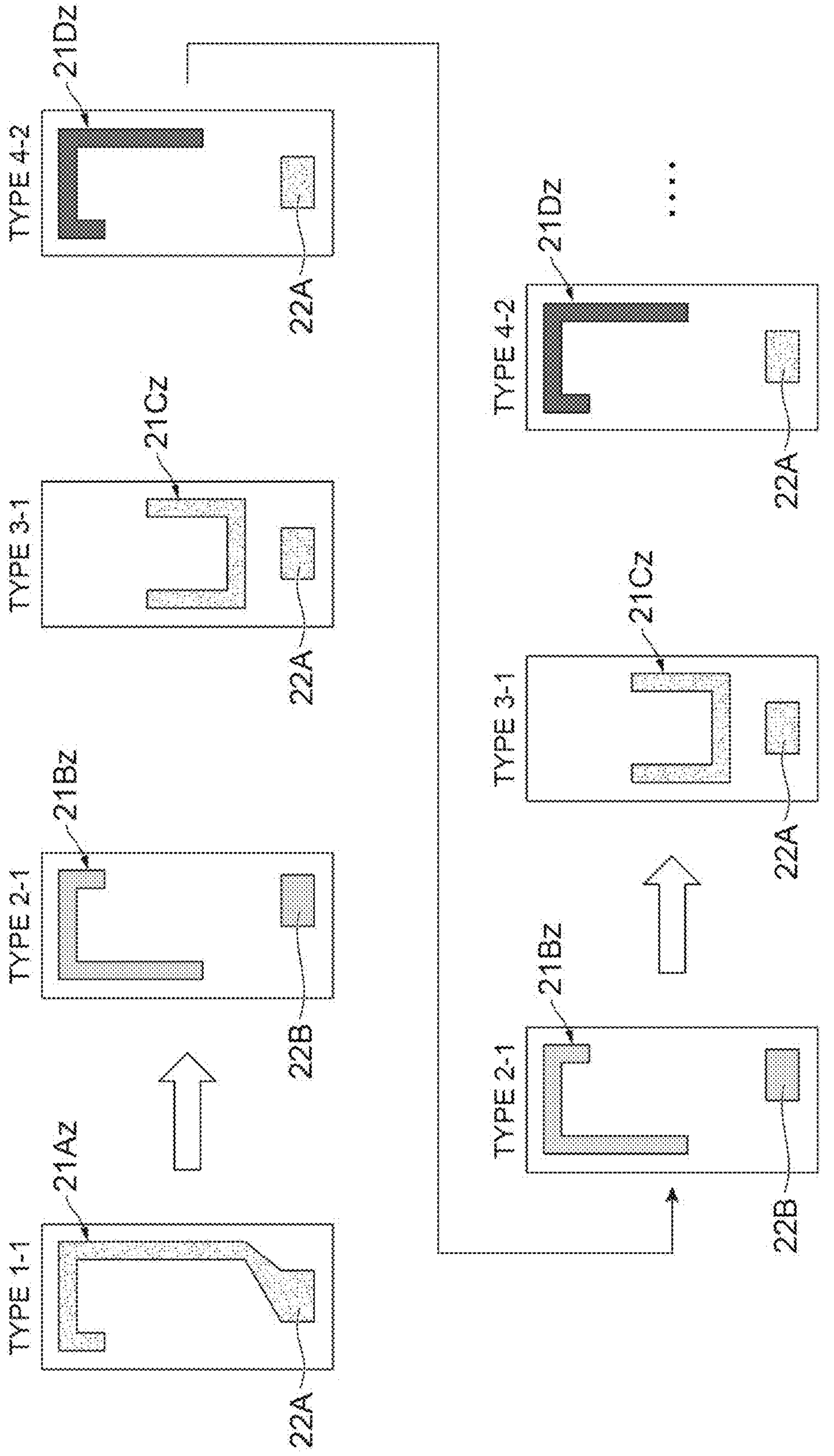
FIG. 13 is a schematic diagram illustrating the order of layer lamination in the fourth embodiment.

As illustrated in FIG. 13, in the fourth embodiment, the Type 1-1 layer 20, the Type 2-1 layer 20, the Type 3-1 layer 20, and the Type 4-2 layer 20 are laminated in this order. Then, the same multilayer pattern is repeated from Type 2-1. In the fourth embodiment as compared with the third embodiment, Type 2-2, Type 3-2, and Type 4-2 are unnecessary and the layers 20 can be reduced in type. As a result, it is possible to reduce the number of masks for pattern formation.

As a result, the multilayer pattern of the through hole pattern 22 becomes as illustrated in FIG. 13. As illustrated in FIG. 12, the multilayer pattern is configured by two types of through hole patterns 22A and 22B. In addition, of the regions E1, E2, and E3, the middle region E2 is a region where all of the through hole patterns 22 overlap when viewed from the lamination direction Z.

As described above, the through hole connecting portion 8 may have the region E2 where all of the through hole patterns 22 overlap when viewed from the lamination direction Z. By adopting such a structure, it is possible to simplify the variation of the combination of the coil pattern 21 and the through hole pattern 22 in each layer 20 and reduce the number of instruments for pattern manufacturing (such as masks).

The present disclosure is not limited to the embodiments described above.

For example, the specific shape of the coil pattern in each layer and the specific shape of the through hole pattern are not particularly limited and may be appropriately changed. In addition, the number of laminated layers, the multilayer pattern, and so on may be adjusted appropriately.

In addition, how the through hole pattern is shifted is not limited to the embodiments described above. For example, a configuration may be adopted in which four or more types of through hole patterns are shifted to the left side gradually and in stages and are shifted to the right side gradually and in stages at a predetermined height. Further, the number of through hole patterns shifted with respect to another through hole pattern is not particularly limited and a configuration in which the through hole pattern is shifted may be adopted in part. In the most extreme example, the through hole pattern may be shifted from another by only one layer in a linearly extending through hole connecting portion.

REFERENCE SIGNS LIST

1: multilayer coil component, 2: element body, 3, 4: external terminal, 6: coil portion, 8: through hole connecting portion, 21: coil pattern, 22: through hole pattern, 22A: middle through hole pattern (first through hole pattern), 22B: right-sided through hole pattern (second through hole pattern), 22C: left-sided through hole pattern (third through hole pattern).

What is claimed is:

1. A multilayer coil component comprising:

an element body formed by laminating a plurality of layers made of an insulator in a lamination direction;

an external terminal formed on a bottom surface of the element body;

a coil portion provided in the element body with a coil axis perpendicular to the bottom surface; and a through hole connecting portion provided in the element body and electrically connecting an end portion of the coil portion and the external terminal, wherein a coil pattern and a through hole pattern are formed in each of the plurality of layers, whereby the coil portion is formed by a plurality of the coil patterns in the lamination direction, and the through hole connecting portion is formed by a plurality of the through hole patterns in the lamination direction, and each coil pattern is formed in a same layer as a corresponding one of the through hole patterns, the through hole pattern in at least one first layer among the plurality of layers is shifted with respect to the through hole pattern in another second layer when viewed from the lamination direction, and when viewed from the lamination direction, a distance between the through hole pattern in the first layer and a coil pattern in the first layer is farther than a distance between the through hole pattern in the second layer and the coil pattern in the first layer.

2. The multilayer coil component according to claim 1, wherein the through hole connecting portion does not have a region where all of the through hole patterns overlap when viewed from the lamination direction.

3. The multilayer coil component according to claim 1, wherein the plurality of through hole patterns are classified into at least three types of a first through hole pattern, a second through hole pattern, and a third through hole pattern disposed at positions mutually shifted when viewed from the lamination direction.

4. The multilayer coil component according to claim 3, wherein the second through hole pattern and the third through hole pattern are connected in the lamination direction via the first through hole pattern, and the second through hole pattern and the third through hole pattern do not overlap when viewed from the lamination direction.

5. The multilayer coil component according to claim 4, wherein a multilayer pattern in which the second through hole pattern and the third through hole pattern are alternately disposed via the first through hole pattern is repeated.

6. The multilayer coil component according to claim 4, wherein in at least one section of the through hole connecting portion, one of the second through hole pattern and the third through hole pattern is disposed on both sides of the first through hole pattern in the lamination direction.

7. The multilayer coil component according to claim 1, wherein the through hole connecting portion has a region where all of the through hole patterns overlap when viewed from the lamination direction.

8. The multilayer coil component according to claim 1, wherein at least two of the layers where the coil pattern and the through hole pattern have the same disposition are continuous.

* * * * *